US012617555B1

(12) United States Patent
Pan

(10) Patent No.: US 12,617,555 B1
(45) Date of Patent: May 5, 2026

(54) ROCKET BASED SPACE STATION

(71) Applicant: PANAM 3D, LLC, Erwinna, PA (US)

(72) Inventor: Nick Pan, Erwinna, PA (US)

(73) Assignee: Panam 3D LLC, Erwinna, PA (US)

( * ) Notice: Subject to any disclaimer, the term of this patent is extended or adjusted under 35 U.S.C. 154(b) by 0 days.

(21) Appl. No.: 19/038,323

(22) Filed: Jan. 27, 2025

Related U.S. Application Data

(60) Provisional application No. 63/626,015, filed on Jan. 28, 2024.

(51) Int. Cl.
*B64G 1/64* (2006.01)
*B64G 1/40* (2006.01)
*F02K 9/00* (2006.01)

(52) U.S. Cl.
CPC . *B64G 1/40* (2013.01); *F02K 9/00* (2013.01)

(58) Field of Classification Search
CPC ........ B64G 1/40; B64G 1/646; B64G 1/6464; B64G 1/64; F02K 9/00
See application file for complete search history.

(56) References Cited

U.S. PATENT DOCUMENTS 3,300,162 A * 1/1967 Maynard .................. B64G 1/12
244/172.4
3,753,536 A * 8/1973 White .................. B64G 1/6462
244/135 A 3,987,742 A * 10/1976 Boisrayon ................ B63G 8/40
114/335
4,728,060 A * 3/1988 Cohen ...................... B64G 1/12
244/159.4
4,858,857 A * 8/1989 Lange .................. B64G 1/6462
405/188
4,860,975 A * 8/1989 Schliesing ............. B64G 1/646
405/188
4,903,919 A * 2/1990 Johnson ............... B64G 1/6462
244/172.4
8,579,233 B2 * 11/2013 Richardson ............ B64D 39/00
244/135 A
9,939,087 B2 * 4/2018 Kolarski ................. F16L 9/125

* cited by examiner

*Primary Examiner* — Valentina Xavier

(74) *Attorney, Agent, or Firm* — LaMorte & Associates P.C.

(57) ABSTRACT

A rocket assembly including a main housing extending from a first end to a second end and having a longitudinal axis between the first and second ends. A plurality of tubes, extending from a first end to a second end, with the second end of each tube connected with the first end of the main housing. At least a subset of the plurality of tubes are pivotal relative to the main housing from a first orientation wherein a longitudinal axis of the tube is substantially parallel with the main housing longitudinal axis and a second orientation wherein a longitudinal axis of the tube is substantially parallel with the main housing longitudinal axis.

8 Claims, 6 Drawing Sheets

ROCKET BASED SPACE STATION

This application claims the benefit of U.S. Prov. Appln. No. 63/626,015, filed on Jan. 28, 2024, the contents of which are incorporated herein by reference.

FIELD OF THE DISCLOSURE

The present disclosure relates generally to an orbital floating space station. More particularly, the present disclosure relates to a floating space station formed via interconnected, configurable rockets.

BACKGROUND

A space station is a spacecraft capable of supporting a human crew in orbit for an extended period of time and is therefore a type of space habitat. Space stations have harbored so far the only long-duration direct human presence in space. As of 2024, there are two fully operational space stations in low Earth orbit (LEO)—the International Space Station (ISS) and China's Tiangong Space Station (TSS). The ISS has hosted the highest number of people in orbit at the same time, reaching 13 for the first time during an eleven day docking in 2009. On May 30, 2023 there were 11 people on the ISS and 6 on China's TSS: with a total of 17 people in orbit, it set the record for most people in orbit as of 2023. These current stations allow for a very limited number of occupants and only for temporary stays.

Additionally, these stations are difficult to build and sustain. For example, after several years, the TSS has only finished its phase 1 construction with the addition of two lab modules. These modules, and any additional modules, must be shuttled into space and are limited in size based on the need for such modules to fit within the payload of a rocket.

SUMMARY

In at least one embodiment, the present disclosure provides a rocket assembly including a main housing extending from a first end to a second end and having a longitudinal axis between the first and second ends. A plurality of tubes, extending from a first end to a second end, with the second end of each tube connected with the first end of the main housing. At least a subset of the plurality of tubes are pivotal relative to the main housing from a first orientation wherein a longitudinal axis of the tube is substantially parallel with the main housing longitudinal axis and a second orientation wherein a longitudinal axis of the tube is substantially parallel with the main housing longitudinal axis.

In at least one embodiment, a second subset of the tubes are fixed in orientation relative to main housing. In at least one embodiment, at least one of the tubes of the second subset has a propulsion engine at its first end.

In at least one embodiment, at least a portion of the tubes and/or main housing are 3D printed.

In at least one embodiment, the disclosure provides a space station including at least first and second rocket assemblies wherein a first end of one of the tubes of the first subset of tubes of the first rocket assembly is interconnected with a first end of one of the tubes of the first subset of tubes of the second rocket assembly.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
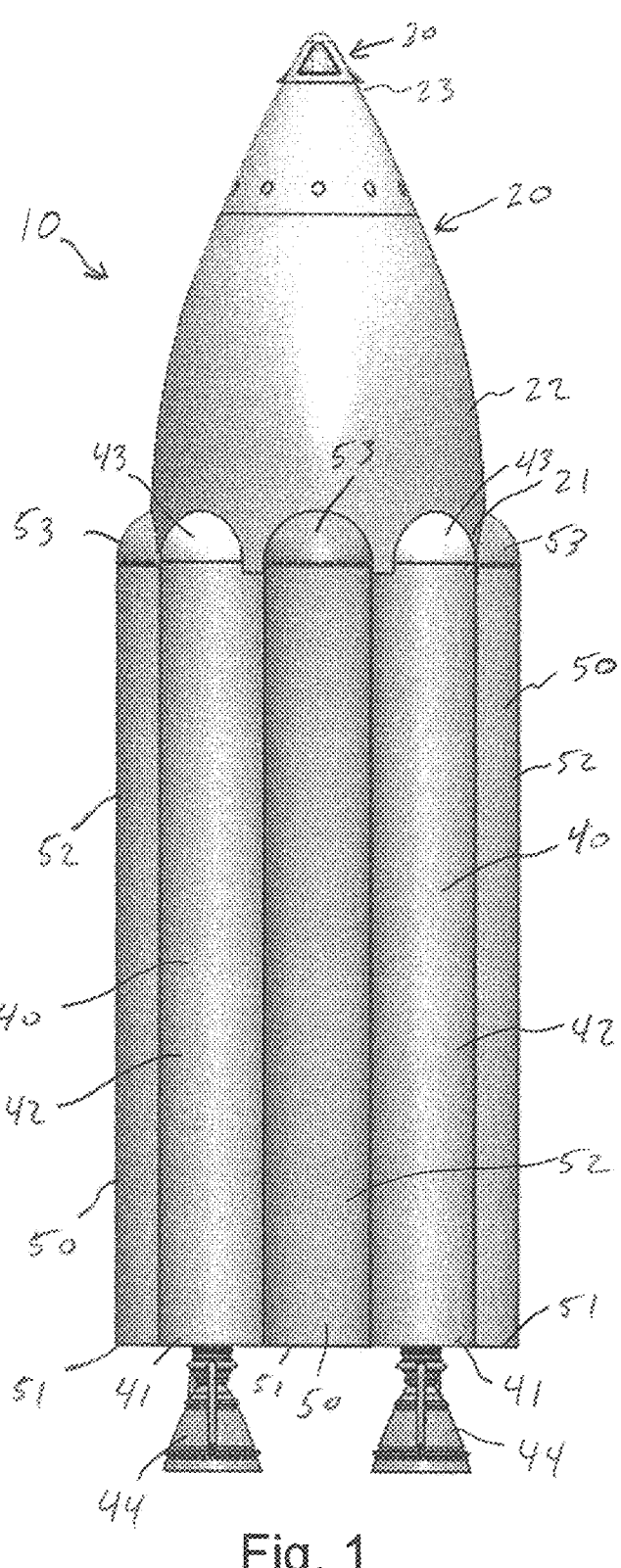
FIG. 1 is a perspective view of a rocket assembly in accordance with an embodiment of the disclosure shown in a launch configuration.
Figure 2:
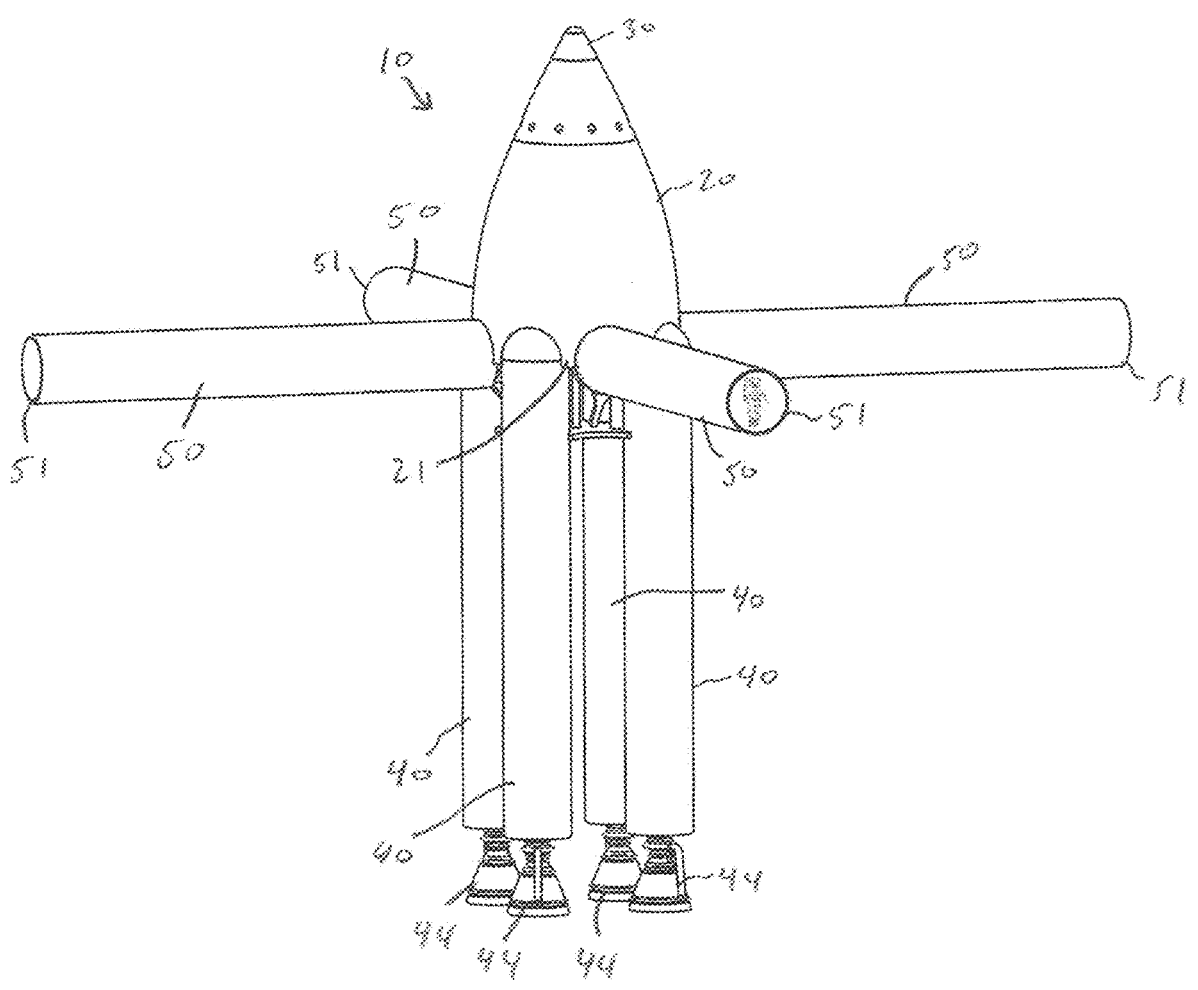
FIG. 2 is a perspective view of the rocket assembly of FIG. 1 in an orbiting configuration.

In the drawings, like numerals indicate like elements throughout. Certain terminology is used herein for convenience only and is not to be taken as a limitation on the present invention. The following describes preferred embodiments of the present invention. However, it should be understood, based on this disclosure, that the invention is not limited by the preferred embodiments described herein.

Figures 3, 4:
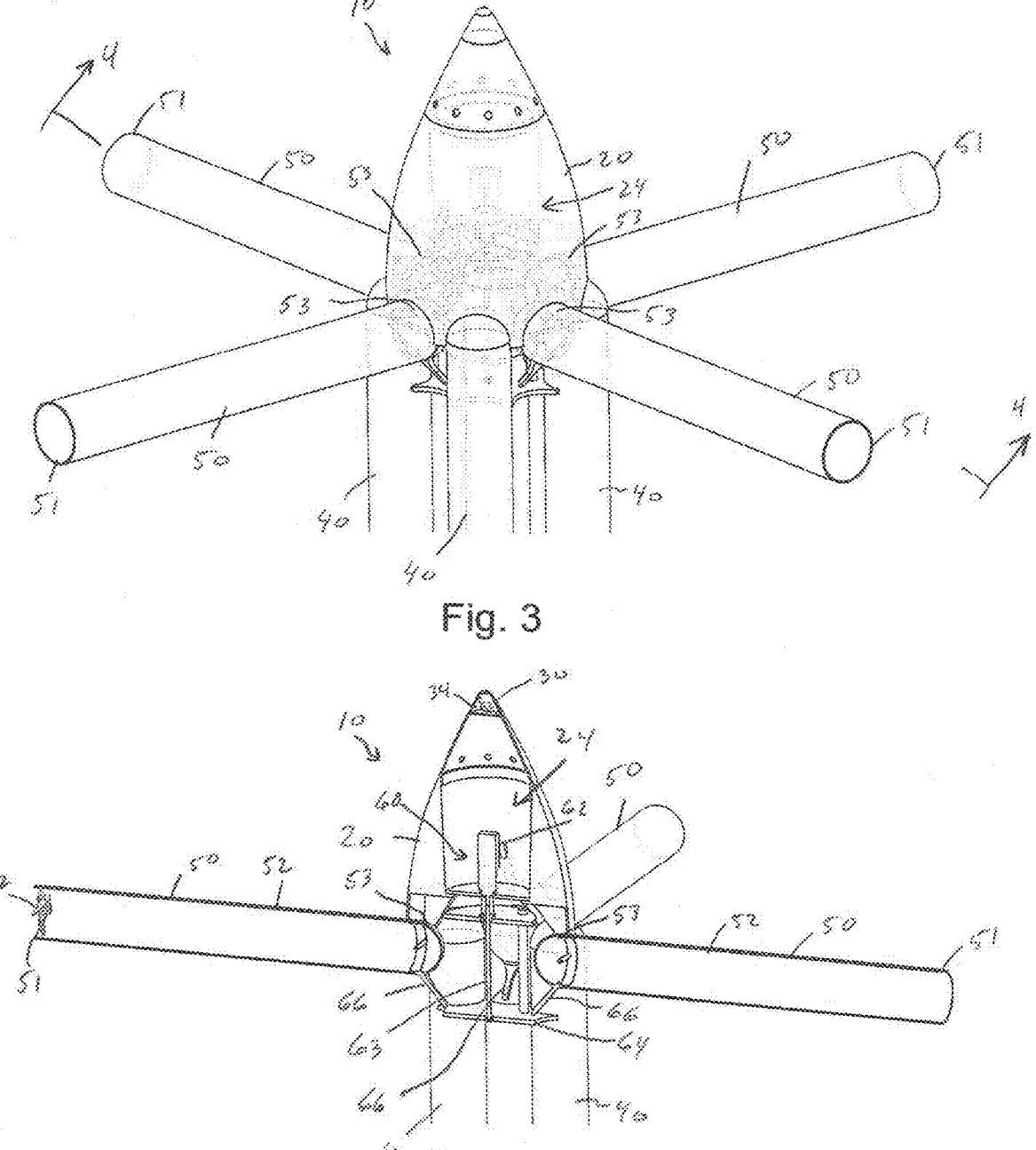
FIG. 3 is an expanded view of the rocket assembly of FIG. 2.
FIG. 4 is a cross-sectional view along the line 4-4 in FIG. 3.

Referring to FIGS. 1-5, a rocket assembly 10 in accordance with an embodiment of the disclosure will be described. The rocket assembly 10 generally comprises a main housing 20 with an outer shell 22 extending from a wide end 21 to a tapered end 23. In the illustrated embodiment, a detachable capsule 30, described in more detail hereinafter, is connected at the tapered end 23. The outer shell 22 is manufactured from strong, lightweight materials like aluminum, stainless steel, titanium, and carbon composites. In at least one embodiment, at least portions of the outer shell 22 are manufactured utilizing 3D printing, for example, utilizing 3D printers as described in U.S. Pat. Nos. 11,273,496 and 11,273,601, and U.S. application Ser. No. 18/139,398, the contents of each of which are incorporated herein by reference. As shown in FIGS. 3 and 4, within the outer shell 22 is an interior chamber 24 which may be configured as desired to provide rooms and the like. For example, multiple floors (not shown) may be included to define a multistory construction which may be further divided by walls (not shown) to define multiple rooms for housing, storage, laboratories, and the like.

Figure 5:
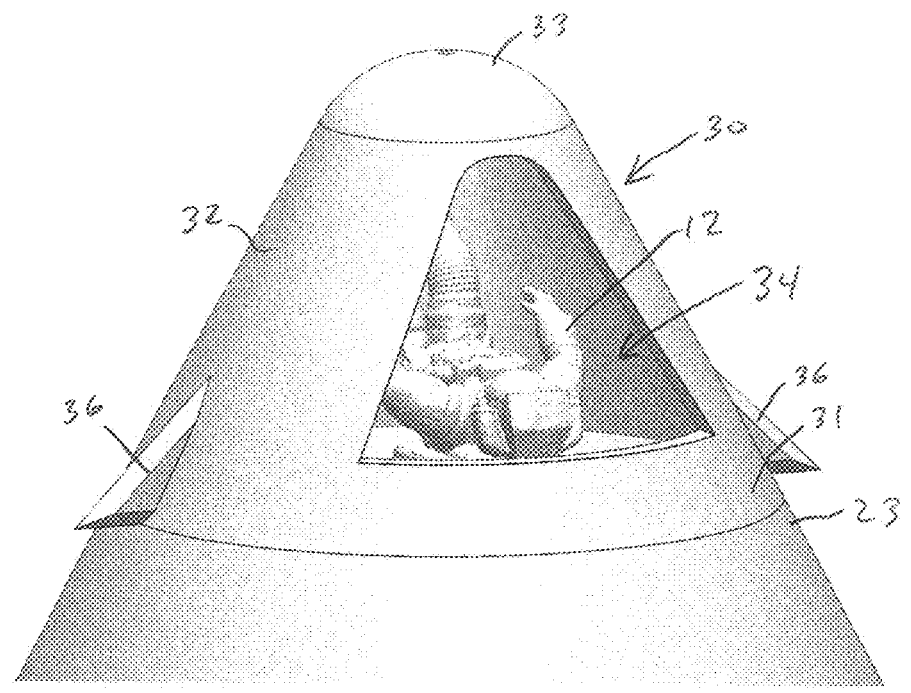
FIG. 5 is is an expanded view of a capsule portion of the rocket assembly of FIG. 2.

Referring to FIG. 5, the illustrative capsule 30 is detachably connected to the tapered end 23 of the main housing 20. The capsule 30 has an outer shell 32 which tapers from a wide end 31 to a tapered end 33. The outer shell 32 is manufactured from strong, lightweight materials like aluminum, stainless steel, titanium, and carbon composites, and may be the same or different material than the main housing outer shell 22. In at least one embodiment, at least portions of the capsule outer shell 32 are manufactured utilizing 3D printing. The wide end 31 of the capsule 30 is sized and configured to complement and mate with the tapered end 23 of the main housing 20. A sealable passage (not shown) or the like may extend between the interior chamber 24 of the main housing 22 and an interior chamber 34 of the capsule 30. The interior chamber 34 is sized to fit at least one crew member 12. The capsule 30 includes a propulsion system (not shown) to facilitate travel away from the main housing 20. The capsule 30 may include fixed or moveable fins 36 or the like which help to facilitate guiding of the capsule 30 as it travels.

Referring again to FIGS. 1-4, a plurality of tubes 40, 50 extend from the wide end 21 of the main housing 20. In the illustrated embodiment, the rocket assembly 10 includes four fixed tubes 40 and four pivotal tubes 50 alternating with one another. It is understood that the number and configuration of tubes 40 and 50 may be varied. Additionally, it is possible that a different percentage, including 100%, of the tubes may be pivotal tubes 50.

Each of the fixed tubes 40 includes a hollow tubular structure 42 extending from a free end 41 to a fixed end 43 connected to the wide end 21 of the main housing 20. In the illustrated embodiment, the fixed end 43 at the connection to the main housing 20 has an aerodynamic configuration. The tubular structure 42 is manufactured from strong, lightweight materials like aluminum, stainless steel, titanium, and carbon composites. It may further include heat-resistant materials with high thermal conductivity, like copper alloys, niobium, and Inconel. In at least one embodiment, at least portions of the tubular structure 42 are manufactured utilizing 3D printing. In the illustrated embodiment, the free end 41 of each fixed tube 40 is provided with a propulsion engine 44. The propulsion engines 44 are configured to provide a liftoff force as well as propulsion of the rocket assembly 10 to a desired orbit. The propulsion engines 44 may be further configured to provide orbital motive force or centrifugal force to the space station assembly, as described below with respect to FIG. 6. The tubular structures 42 are preferably generally hollow and configured to carry fuel and the like. After reaching orbit, some or all of the fixed tubes 40 may be converted and utilized for storage or additional usable space. In this regard, a sealable passage (not shown) may be provided between the main housing interior chamber 24 and the hollow interior of the respective tube 40.

Each of the pivotal tubes 50 includes a hollow tubular structure 52 extending from a free end 51 to a pivot end 53 connected to the wide end 21 of the main housing 20. In the illustrated embodiment, the pivot end 53 at the connection to the main housing 20 has an aerodynamic configuration. The tubular structure 52 is manufactured from strong, lightweight materials like aluminum, stainless steel, titanium, and carbon composites. It may further include heat-resistant materials with high thermal conductivity, like copper alloys, niobium, and Inconel. In at least one embodiment, at least portions of the tubular structure 52 are manufactured utilizing 3D printing. The tubular structures 52 have a diameter which is sized such that an average crew member 12 can stand within the structure 52, see FIGS. 2 and 4. An illustrative diameter may be 8-10 feet, but the disclosure is not limited to such.

Each of the pivotal tubes 50 is configured to pivot relative to the main housing 20. In the illustrated embodiments, each of the pivotal tubes 50 is configured to pivot between a launch orientation shown in FIG. 1, wherein the longitudinal axis thereof is substantially parallel to the longitudinal axis of the main housing 20, to an orbiting orientation shown in FIGS. 2-4, wherein the longitudinal axis thereof is substantially perpendicular to the longitudinal axis of the main housing 20. Other orientations may be utilized and the various tubes 50 may pivot over different ranges.

Referring to FIGS. 3 and 4, an illustrative pivot assembly 60 is illustrated. The disclosure is not limited to such and other pivot assemblies may be utilized, including different assemblies for each tube 50. In the illustrated embodiment, the pivot end 53 of each tube 50 is connected via linkage 66 to a moveable platform 64. The platform 64 is connected via an extendable shaft 63 to a motor 62. The motor 62 is controllable to extend or retract the shaft 63 and thereby the platform 64. When the shaft 63 is retracted and the platform 64 moved toward the motor 62, the linkage 66 causes each respective tube 50 to move toward the launch orientation. Once the rocket assembly 20 is in a desired orbital position, the shaft 63 and platform 64 are extended such that the linkage 66 causes each tube 50 to be pivoted to the orbiting orientation. The pivot ends 53 are configured such that they formed a sealed connection with the main housing 20 and a passage is defined between the main housing interior chamber 24 and the interior of the tubular structure 52.

Figure 6:
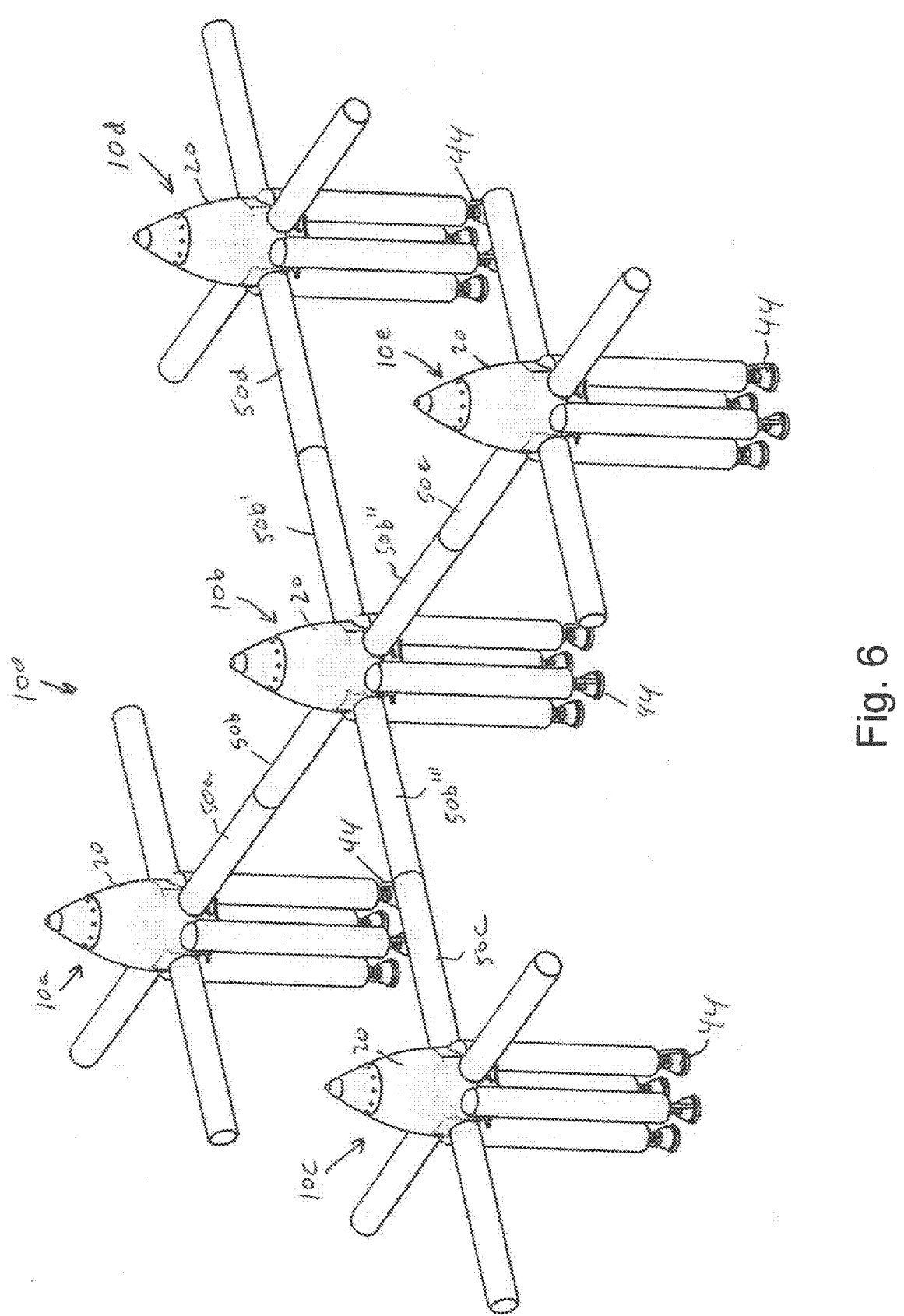
FIG. 6 is a perspective view of a space station assembly formed via a plurality of rocket assemblies.

Referring to FIG. 6, the free end 51 of each pivotal tube 50 is configured to be sealingly connected to the free end 51 of another pivotal tube 50 to form an orbiting space station 100. As illustrated, the free end of tube 50a of rocket assembly 10a is configured to connect with the free end of the tube 50b of rocket assembly 10b. Similarly, the free end of tube 50c of rocket assembly 10c is configured to connect with the free end of the tube 50b' of rocket assembly 10b, the free end of tube 50d of rocket assembly 10d is configured to connect with the free end of the tube 50b" of rocket assembly 10b, and the free end of tube 50e of rocket assembly 10e is configured to connect with the free end of the tube 50b''' of rocket assembly 10b. In this way, the space station 100 is infinitely expandable as each rocket assembly 10 meets up with the existing station. It is further contemplated that 3D printers, including those as described in U.S. Pat. Nos. 11,273,496 and 11,273,601, and U.S. application Ser. No. 18/139,398, may be provided in one or more of the rocket assemblies 10 and utilized to print additional components, including additional tubes, directly in orbit.

Figure 7:
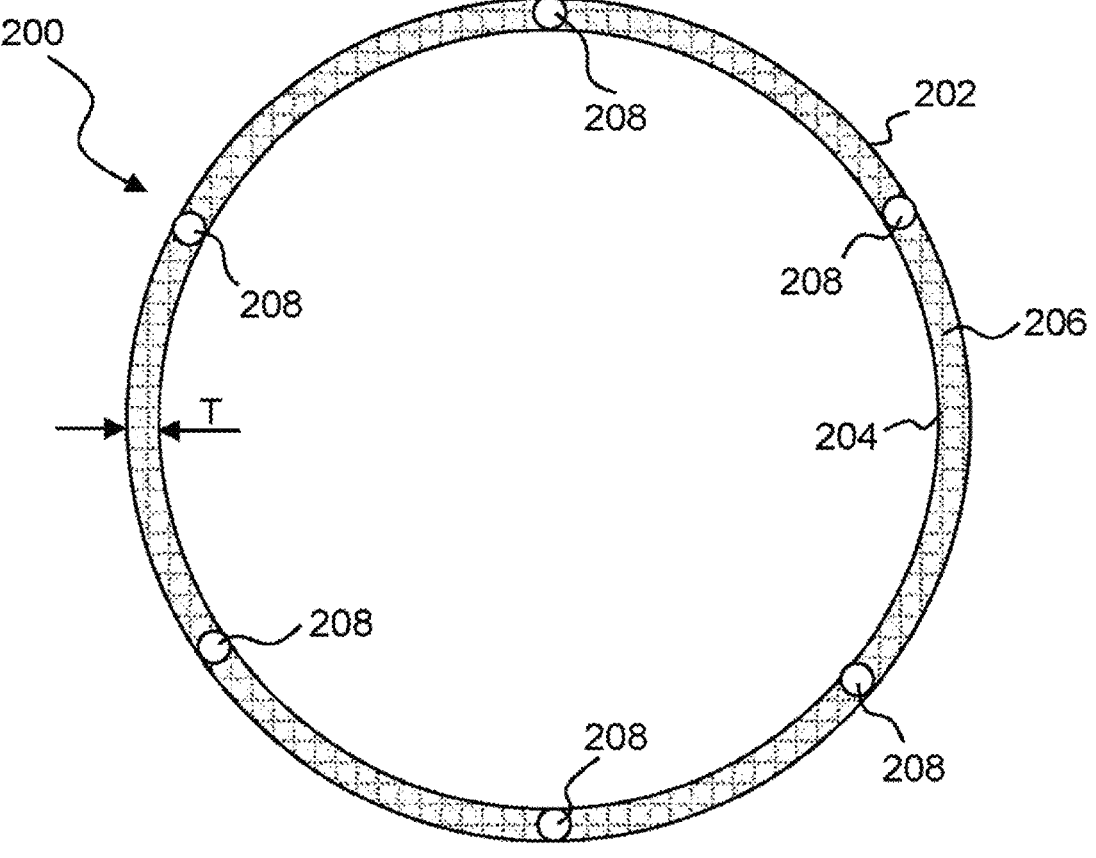
FIG. 7 is a plan view of an illustrative double walled tube.

Referring to FIG. 7, one or more of the fixed or pivotal tubes 40, 50 may be formed as a double walled structure 200 with an outer wall 202 and an inner wall 204 with a thickness T therebetween. The space between the walls 202, 204 may be hollow such that it can be filled with water, air, insulation or other materials. Alternatively, as illustrated, various structures may be formed between the walls 202, 204, for example, the illustrated honeycomb interior 206 and interior conduits 208. The honeycomb interior 206 provides greater strength and rigidity while the conduits 208 provide passages for wiring, ventilation and the like.

These and other advantages of the present invention will be apparent to those skilled in the art from the foregoing specification. Accordingly, it will be recognized by those skilled in the art that changes or modifications may be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A space station including comprising:
a plurality of rocket assemblies, wherein each of said rocket assemblies has a main housing and a longitudinal axis, wherein a plurality of pivotal tubes are attached to said main housing that are selectively positionable relative to said main housing from a first orientation that is substantially parallel with said longitudinal axis and a second orientation that is substantially perpendicular with said longitudinal axis;
wherein said pivotable tubes from at least two of said plurality of rocket assemblies are interconnected in said second orientation to provide a passage between said at least two of said plurality of rocket assemblies.

2. The space station of claim 1 wherein each of said plurality of rocket assemblies further includes a plurality of fixed tubes that are fixed in orientation relative to said main housing.

3. The space station of claim 2 wherein at least one of said plurality of fixed tubes supports a propulsion engine.

4. The space station of claim 1, wherein at least a portion of said plurality of pivotal tubes are 3D printed.

5. The space station of claim 1 wherein at least one of said plurality of pivotal tubes is formed with a double-walled structure having a space between an outer wall and an inner wall.

6. The space station of claim 5 wherein said space is hollow.

7. The space station of claim 5 wherein said space has a reinforcing structure formed therein.

8. The space station of claim 5 wherein said space has at least one elongate conduit formed therein.

* * * * *